(12) United States Patent
Mukai (10) Patent No.: US 6,231,107 B1
(45) Date of Patent: May 15, 2001

(54) GAS TANK DOOR AND METHOD OF USE

(76) Inventor: Randall T. Mukai, 8334 Elsmore Dr., South San Gabriel, CA (US) 91770

( * ) Notice: Subject to any disclaimer, the term of this patent is extended or adjusted under 35 U.S.C. 154(b) by 0 days.

(21) Appl. No.: 09/591,858

(22) Filed: Jun. 12, 2000

(51) Int. Cl.⁷ .................................................. B62D 25/00
(52) U.S. Cl. ............................. 296/97.22; 220/86.2
(58) Field of Search ........................ 296/97.22; 220/86.2

(56) References Cited

U.S. PATENT DOCUMENTS

| | | | |
|---|---|---|---|
| 3,913,639 | * 10/1975 | Davis | 220/86.2 |
| 4,746,089 | * 5/1988 | Clapper | 296/97.22 |
| 5,044,678 | * 9/1991 | Detweiler | 296/97.22 |
| 5,071,018 | * 12/1991 | Moore | 220/86.2 |
| 5,524,786 | * 6/1996 | Skeudlarek | 296/97.22 |
| 5,658,036 | * 8/1997 | Benoist | 296/97.22 |
| 5,664,811 | * 9/1997 | Martus et al. | 296/97.22 |
| 5,732,842 | * 3/1998 | Krause et al. | 296/97.22 |
| 5,836,638 | * 11/1998 | Stocum | 296/97.22 |
| 5,845,800 | * 12/1998 | Shaw et al. | 220/86.2 |
| 5,884,958 | * 3/1999 | Oddenino | 296/97.22 |
| 5,906,406 | * 5/1999 | Pajakowski | 296/97.22 |
| 5,924,757 | * 7/1999 | Stapf | 296/97.22 |

* cited by examiner

*Primary Examiner*—Joseph D. Pape
*Assistant Examiner*—Kiran B. Patel
(74) *Attorney, Agent, or Firm*—Timothy Thut Tyson; Ted Masters; Freilich, Hornbaker & Rosen (57) ABSTRACT

A gas tank door (20) for a motor vehicle (502) includes a frame (22) and an outwardly moveable cover (24). Cover (24) moves outwardly a predetermined distance (D), and then may be rotated out of the way to permit access to gas tank filler cap (500). In a preferred embodiment, an actuator (30) effects the outward movement of cover (24).

16 Claims, 8 Drawing Sheets

GAS TANK DOOR AND METHOD OF USE

TECHNICAL FIELD

The present invention pertains generally to gas tank doors for motor vehicles, and in particular to a gas tank door having a cover which moves outwardly, and may then be rotated to obtain access to the gas tank filler cap.

BACKGROUND ART

Gas tank doors for motor vehicles are well known in the art. Typically these devices comprise a simple hinged door that may be selectively opened to expose the gas tank filler cap. In another less common type of gas tank door, the door is completely removable from the vehicle.

DISCLOSURE OF INVENTION

The present invention is directed to a gas tank door which mounts on the body of a motor vehicle, over the gas tank filler cap, and which may be opened to permit access to fill the gas tank. The present invention both provides a novel gas tank door structural design, and the aesthetic look of gas tank doors which are utilized on racing vehicles. The present invention may be installed in motor vehicles of all types either as original equipment, or on a retrofit basis.

In accordance with a preferred embodiment of the invention, a gas tank door includes a frame and a cover which is generally located inside the frame. In the closed position, the frame and the cover define a first plane, which in a preferred embodiment is substantially coplanar with the body surface of the motor vehicle. The cover is outwardly movable a predetermined distance to a second plane.

In accordance with another preferred embodiment of the invention, when moved to the second plane, the cover may be rotated or swung out of the way in the second plane to obtain access to the gas tank filler cap. The predetermined distance is selected so that when the cover is rotated, it will not interfere with the body or surface of the motor vehicle.

In accordance with an important aspect of the invention, an actuator is connected between the frame and the cover. When activated, the actuator moves the cover outward to the second plane.

In accordance with another feature of the invention, the actuator contains a mechanical stop which cooperates with a recess in the cover to limit the rotation of the cover.

In accordance with another preferred embodiment of the invention, the cover pivots in a third plane which is substantially perpendicular to the second plane, and may be pivoted upward to expose the gas tank filler cap.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 12 is a reduced front elevation view of the present invention in the closed position installed on a motor vehicle; and, FIG. 13 is a reduced fragmented side elevation view of the present invention in the open position installed on the motor vehicle.

MODES FOR CARRYING OUT THE INVENTION

Referring initially to FIGS. 1 through 7, there are illustrated front elevation, side elevation closed, side elevation opened, front elevation opened and rotated, closed perspective, opened perspective, and opened rotated perspective views respectively of a gas tank door for a motor vehicle in accordance with the present invention, generally designated as 20. Gas tank door 20 includes a frame 22 which defines a first plane $P_1$. A cover 24 is substantially disposed within frame 22 and movably connected thereto. Cover 24 is selectively outwardly movable in direction 23 along axis 29 to a second plane $P_2$ which is spaced a predetermined D distance from first plane $P_1$. In a preferred embodiment first plane $P_1$ and second plane $P_2$ are substantially parallel, however this is not a requirement. Predetermined distance D is selected so that when cover 24 is disposed in plane $P_2$, cover 24 may be rotated in plane $P_2$ without interfering with either frame 22 or the body surface of the motor vehicle 502 (refer also to FIGS. 12 and 13). When moved to second plane $P_2$, cover 24 is rotatable in second plane $P_2$. Frame 22 has an aperture 26 under which lies gas tank filler cap 500. Cover 24 is rotatable in direction 25 about axis 27 so as to expose aperture 26 of frame 22, and thereby permit access to gas tank filler cap 500. Cover 24 has a retractable handle 28 for manually rotating cover 24.

Figure 1:
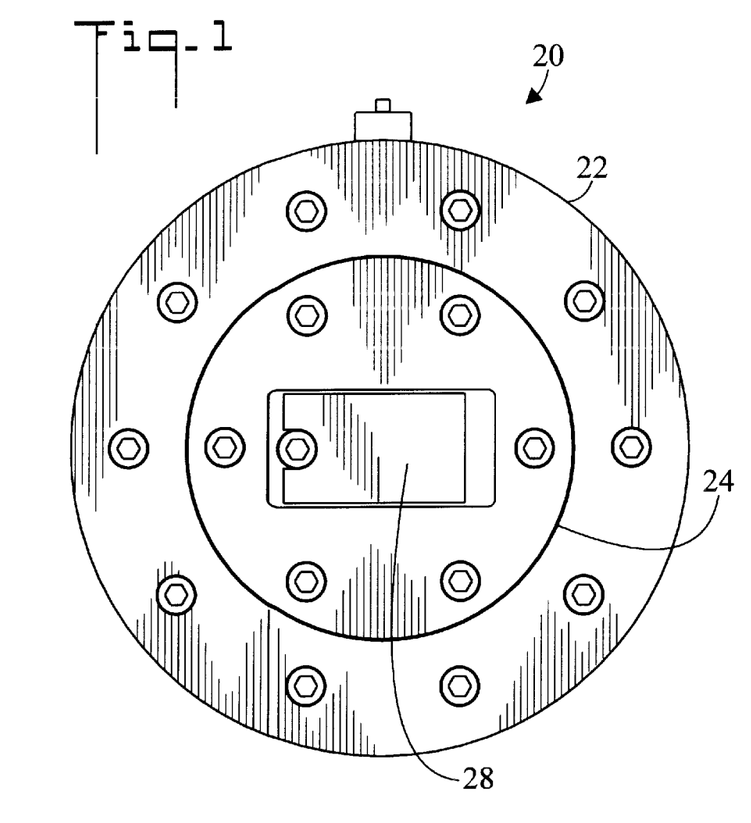
FIG. 1 is a front elevation view of a gas tank door in accordance with the present invention.
Figure 2:
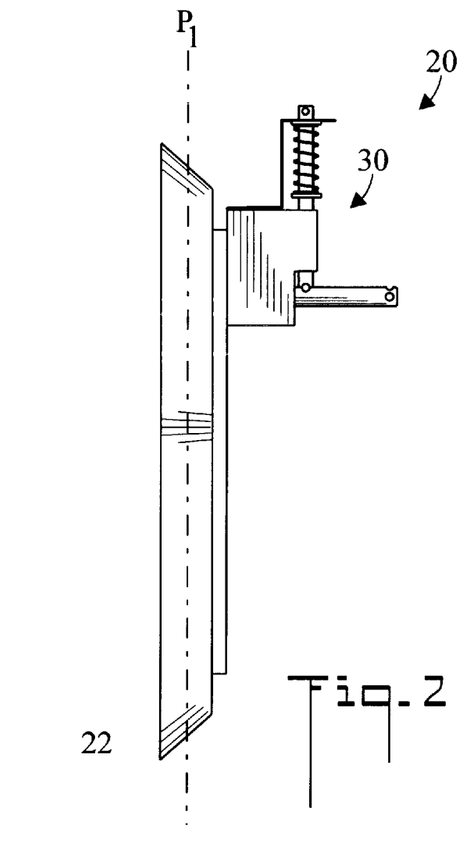
FIG. 2 is a closed side elevation view.
Figure 3:
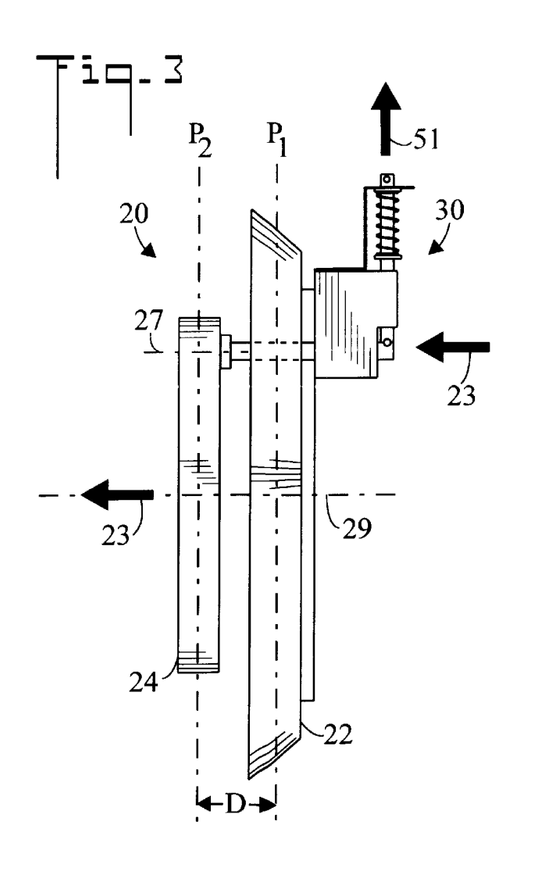
FIG. 3 is an opened side elevation view of the gas tank door showing a cover moved outwardly away from a fame.
Figure 4:
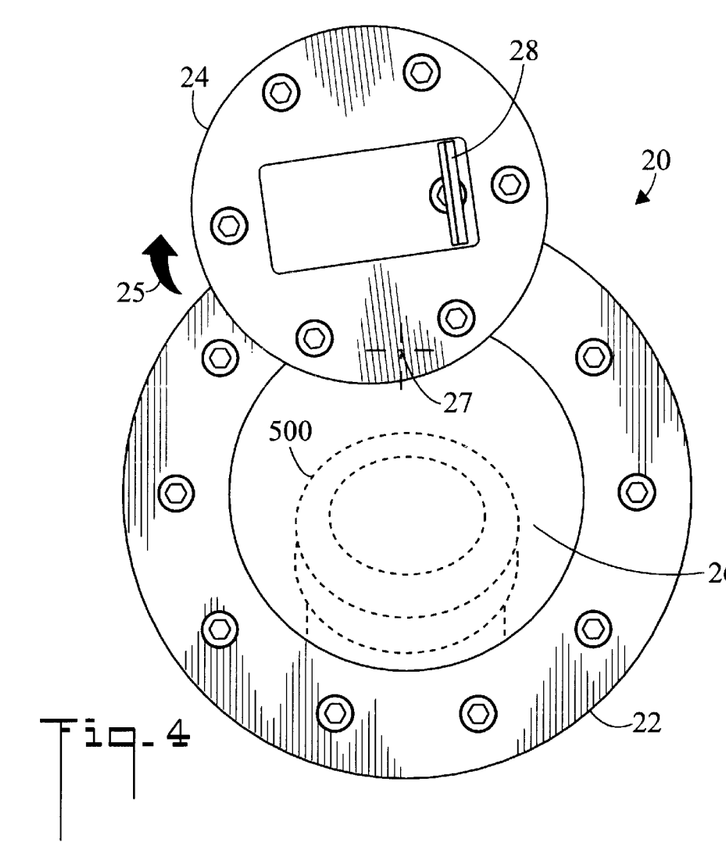
FIG. 4 is an opened front elevation view of the cover rotated to permit access to the gas tank filler cap.
Figure 5:
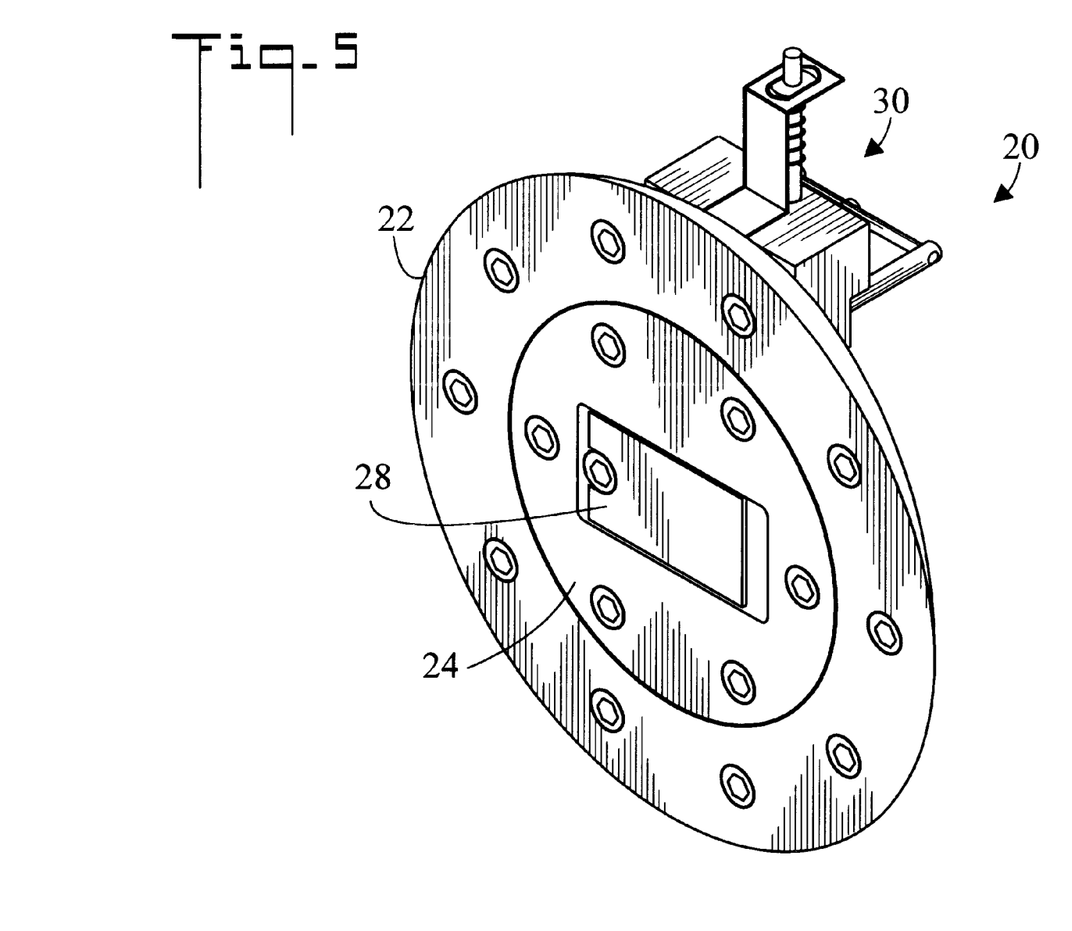
FIG. 5 is a perspective view of the present invention showing the cover in the closed position.
Figure 6:
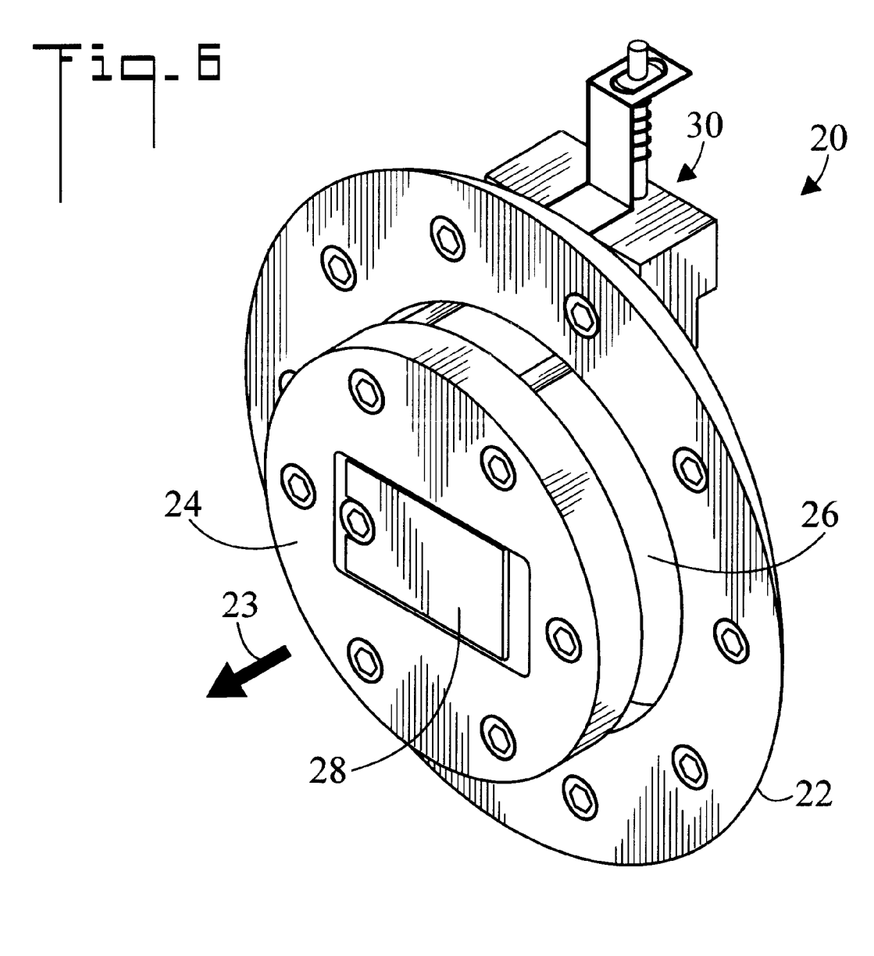
FIG. 6 is an opened perspective view showing the cover moved outwardly away from the frame.
Figure 7:
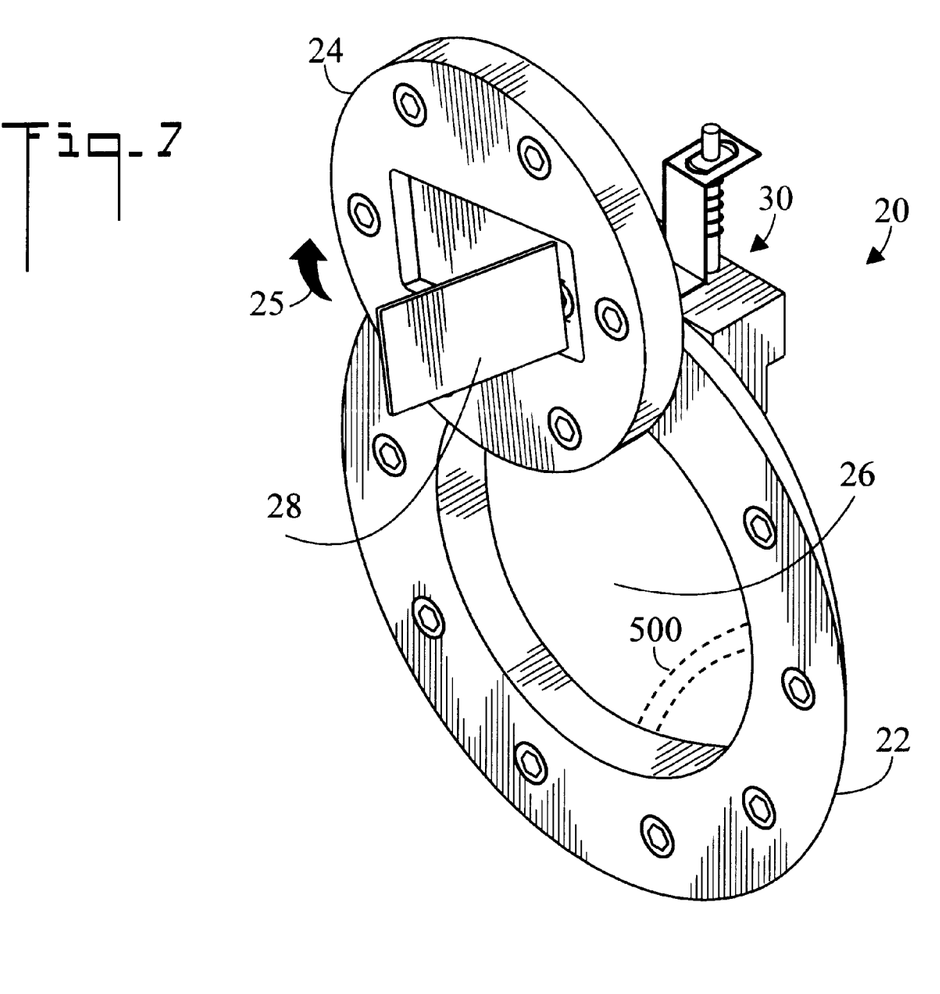
FIG. 7 is an opened perspective view showing the cover rotated to permit access to the gas tank filler cap.
Figure 8:
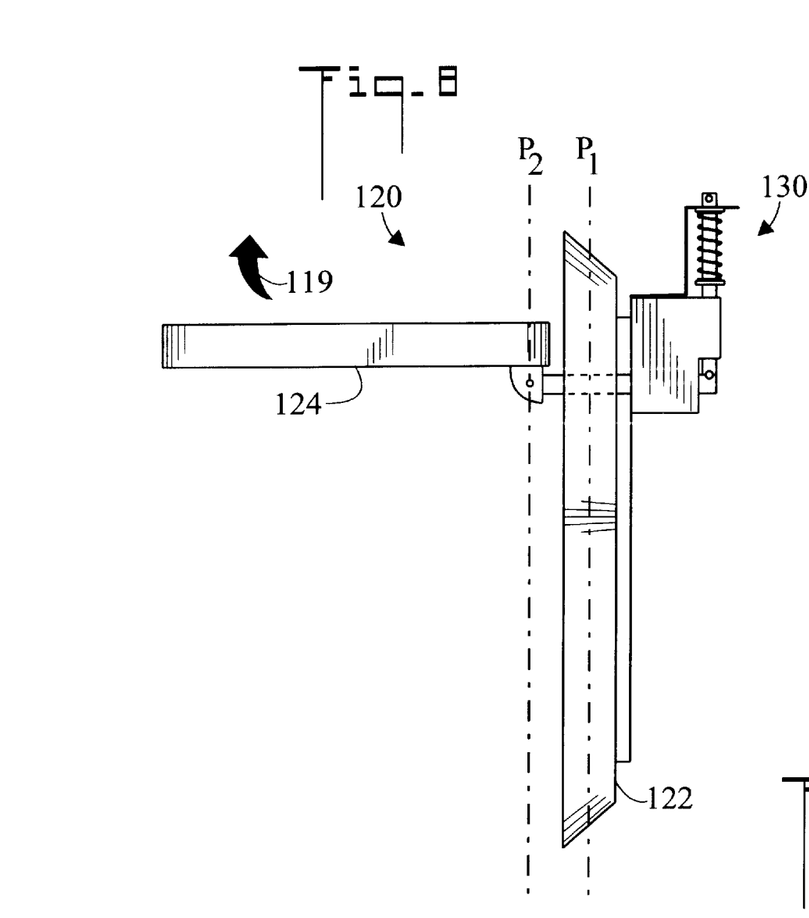
FIG. 8 is a side elevation view of a second embodiment wherein the cover is hinged and pivoted upward.
Figure 9:
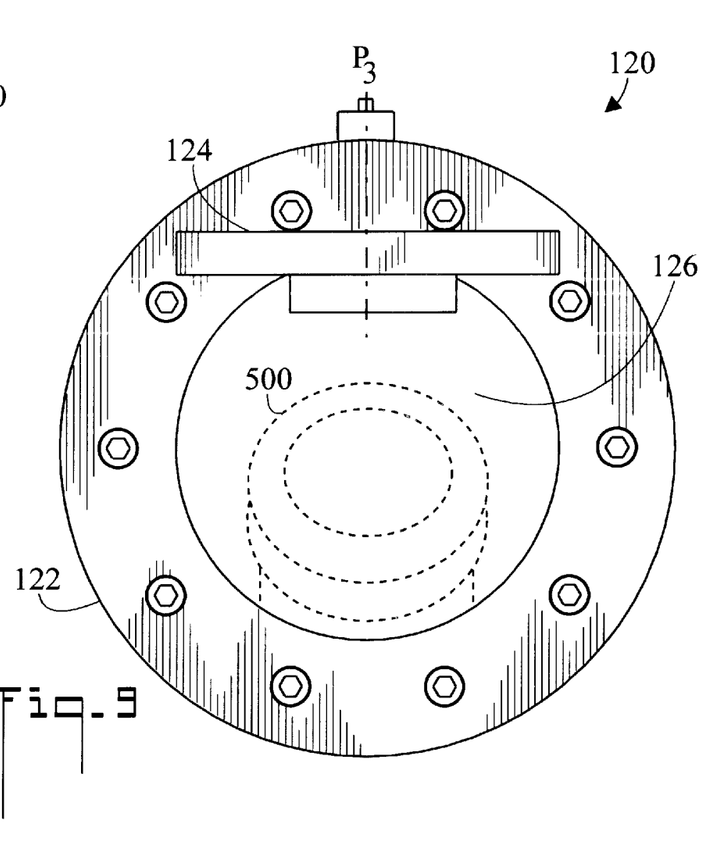
FIG. 9 is a front elevation view of the second embodiment with the cover pivoted upward to permit access to the gas tank filler cap.

While the outward movement of cover 24 could be accomplished manually, in a preferred embodiment an actuator 30 (also refer to FIGS. 10 and 11) is connected between frame 22 and cover 24. When actuator 30 is activated, cover 24 is caused to move outwardly in direction 23 to second plane $P_2$ Referring now to FIGS. 8 and 9, there are illustrated side and front elevation views respectively of a second embodiment, generally designated as 120. Actuator 130 is connected between frame 122 and cover 124, and when activated moves cover 124 to second plane $P_2$ in a similar fashion to embodiment 20. When moved to second plane $P_2$, cover 124 is rotatable in a third plane $P_3$ which is substantially perpendicular to second plane $P_2$. That is, cover 124 may be pivoted, upward in direction 119 in the shown preferred embodiment, so as to expose aperture 126 in frame 122 and thereby permit access to gas tank filler cap 500.

In terms of use, gas tank door 20 is operated by activating actuator 30 causing cover 24 to move outward to second plane $P_2$. Cover 24 is then rotated to expose aperture 26 of frame 22 and thereby obtain access to gas tank filler cap 500.

Figure 10:
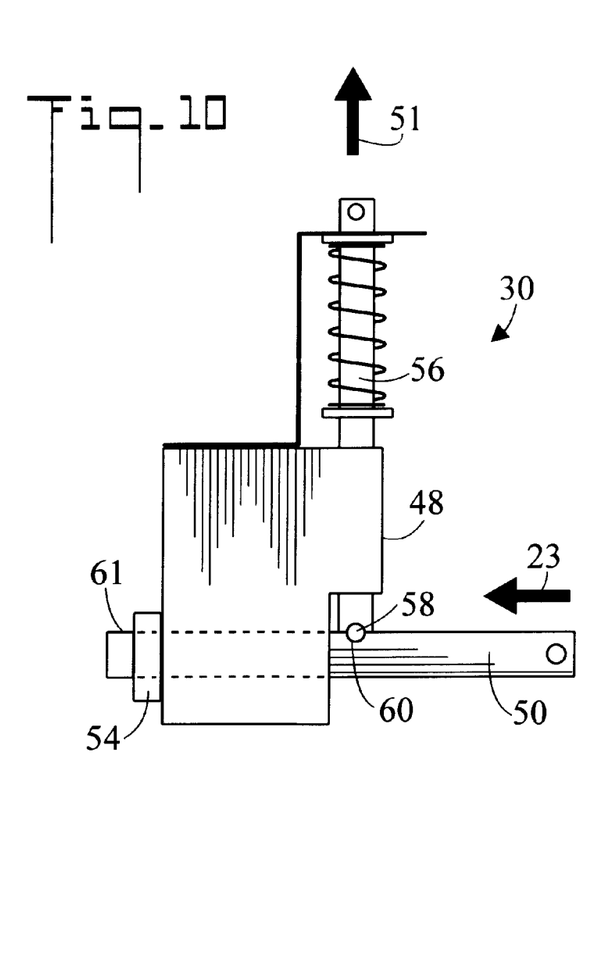
FIG. 10 is an enlarged side elevation view of an actuator.
Figure 11:
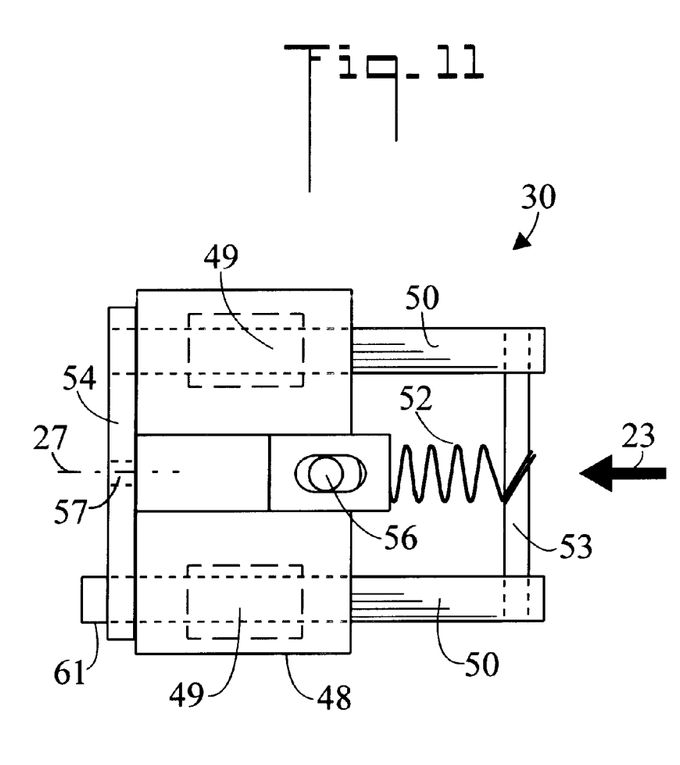
FIG. 11 is an enlarged top plan view of the actuator.

Referring now to FIGS. 10 and 11, there are illustrated enlarged side elevation and top plan views respectively of actuator 30. Actuator 30 includes a body 48 which is connected to frame 22. Actuator 30 includes at least one piston 50 (two in the shown preferred embodiment). A spring 52 activates pistons 50 causing them to move in direction 23. Pistons 50 move inside linear bearings 49. An alignment bar 54 ensures that pistons 50 remain in spaced parallel relationship, and also connects actuator 30 to cover 24. A floating pin 53 is used to attach spring 52. To release pistons 50 in direction 23, actuation pin 56 is pulled in direction 51 thereby removing rod 58 from grooves 60 in pistons 50. Actuation pin 56 may be pulled mechanical, or by electrical means such as with a solenoid. A clearance hole 57 in alignment bar 54, allows cover 24 to be pivotally connected to actuator 30 about pivot axis 27. A mechanical stop 61 cooperates with a recess in cover 24 to limit the rotation of cover 24.

Figures 12, 13:
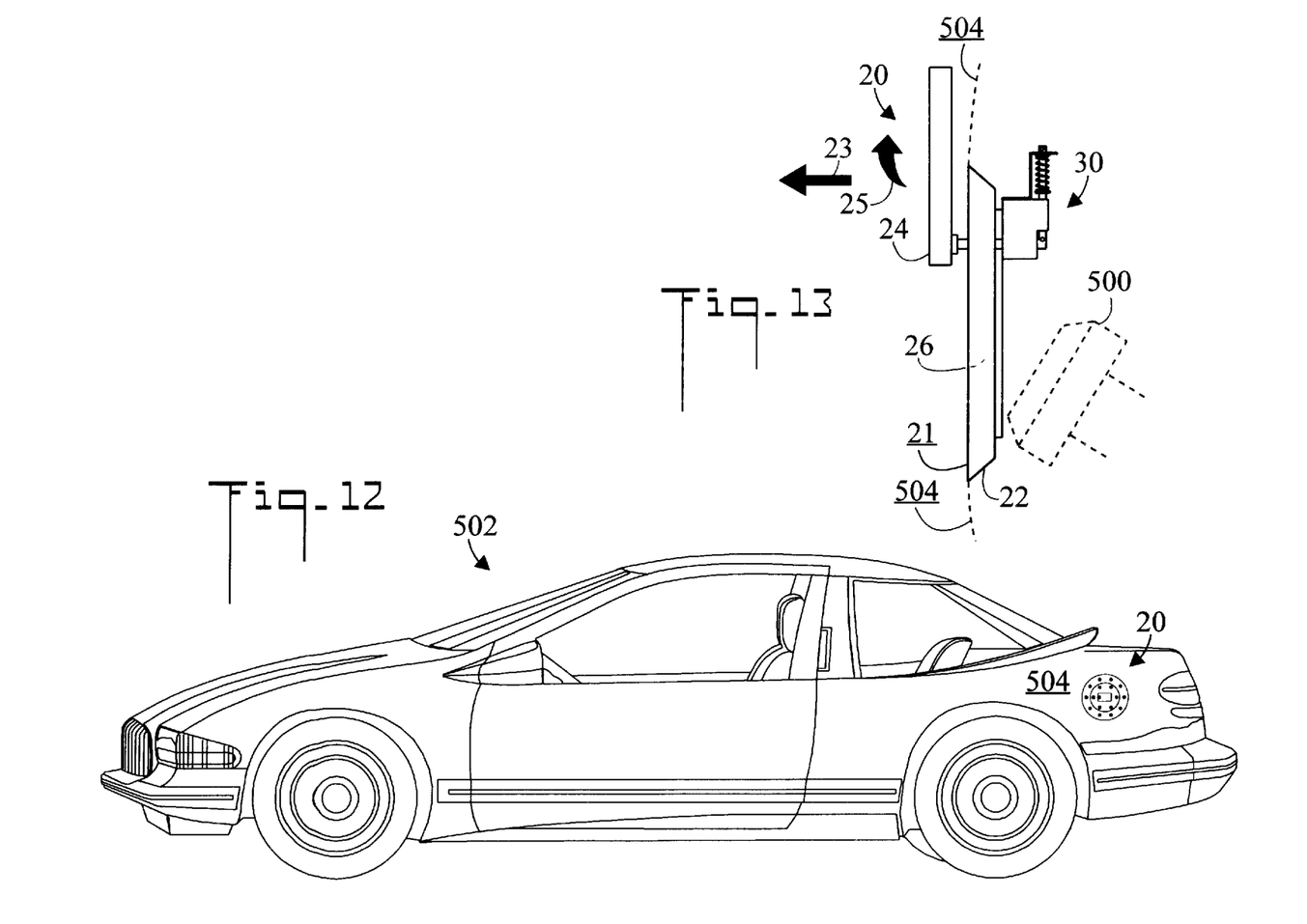

Referring now to FIGS. 12 and 13, there are illustrated front and side elevation views of gas tank door 20 installed on a motor vehicle 502 having a body surface 504. Frame 22 is connected to body surface 504, typically so that the front surface 21 of frame 22 is flush with body surface 504. Cover 24 is selectively movable a predetermined distance away from body surface 504 in direction 23. When moved away from body surface 504, cover 24 is rotatable in direction 25 so as to expose aperture 26 of frame 22, and thereby obtain access to gas tank filler cap 500. Actuator 30 moves cover 24 away from body surface 504.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A gas tank door, comprising:

a frame defining a first plane;

a cover substantially disposed within said frame and movably connected thereto; and, said cover selectively movable to a second plane, said second plane spaced a predetermined distance from said first plane.

2. A gas tank door according to claim 1, further including:

when moved to said second plane, said cover rotatable in said second plane.

3. A gas tank door according to claim 2, further including:

said frame having an aperture; and, said cover rotatable so as to expose said aperture of said frame.

4. A gas tank door according to claim 3, further including:

said cover having a handle for manually rotating said cover.

5. A gas tank door according to claim 1, further including:

an actuator connected between said frame and said cover; and, when activated, said actuator moving said cover to said second plane.

6. A gas tank door according to claim 5, further including:

said actuator including at least one piston.

7. A gas tank door according to claim 6, further including:

a spring activating said at least one piston.

8. A gas tank door according to claim 5, further including:

a mechanical stop disposed on said actuator for limiting the rotation of said cover.

9. A gas tank door according to claim 1, further including:

said second plane substantially parallel to said first plane.

10. A gas tank door according to claim 1, further including:

when moved to said second plane, said cover rotatable in said second plane, said second plane substantially parallel to said first plane;

said frame having an aperture;

said cover rotatable so as to expose said aperture of said frame;

an actuator connected between said frame and said cover; and, when activated, said actuator moving said cover to said second plane.

11. A gas tank door according to claim 1, further including:

an actuator connected between said frame and said cover;

when activated, said actuator moving said cover to said second plane; and when moved to said second plane, said cover rotatable in a third plane, said third plane substantially perpendicular to said second plane.

12. A gas tank door according to claim 11, further including:

said frame having an aperture; and, said cover rotatable so as to expose said aperture of said first frame.

13. A method of opening a gas tank door, comprising:

providing a gas tank door including a frame having a aperture and defining a first plane, a cover substantially disposed within said frame and movably connected thereto, said cover selectively movable to a second plane, said second plane spaced a predetermined distance from said first plane, and an actuator connected between said frame and said cover;

activating said actuator causing said cover to move to said second plane; and, rotating said cover so as to expose said aperture of said frame.

14. A gas tank door for a motor vehicle having a body surface, said gas tank door comprising:

a frame connected to the body surface;

a cover substantially disposed within said frame and movably connected thereto; and, said cover selectively movable a predetermined distance away from the body surface.

15. A gas tank door according to claim 14, further including:

said frame having an aperture; and, when moved away from the body surface, said cover rotatable so as to expose said aperture of said frame.

16. A gas tank door according to claim 14, further including:

an actuator connected between said frame and said cover; and, when activated, said actuator moving said cover away from the body surface.

* * * * *